United States Patent [19]
Colles

[11] Patent Number: 5,150,077
[45] Date of Patent: Sep. 22, 1992

[54] GENERATION OF HORTIZONTAL SYNC PULSE

[75] Inventor: Joseph H. Colles, Vista, Calif.

[73] Assignee: Brooktree Corporation, San Diego, Calif.

[21] Appl. No.: 766,817

[22] Filed: Sep. 26, 1991

[51] Int. Cl.$^5$ .............................................. H03L 7/00
[52] U.S. Cl. .................................... 331/1 A; 331/16; 331/23; 331/34; 358/155; 358/158
[58] Field of Search ...................... 331/1 A, 16, 18, 23, 331/25, 34; 358/148, 149, 150, 153, 154, 155, 158

[56] References Cited

U.S. PATENT DOCUMENTS 4,245,251  1/1981  Steckler et al. ................... 358/158

Primary Examiner—Robert J. Pascal
Attorney, Agent, or Firm—Ellsworth R. Roston; Charles H. Schwartz

[57] ABSTRACT

A system eliminates the adverse effects of serration and equalization pulses (periodically generated during the vertical sync interval) in regulating the frequency of horizontal sync pulses. These sync pulses provide timing information to regulate a video display. The system includes circuitry for stripping and processing the horizontal and vertical sync signals and the serration pulses from the video signals. These pulses are introduced to a first AND gate and through a first display line to an input of a second AND gate. Frequency divider output signals are introduced to the first AND gate and to a third AND gate through a second delay line having an equal delay with the first delay line. The output from the first AND gate passes to second inputs of the second and third AND gates. The second and third AND gates produce signals which represent the time difference between the sync and divider output signals and which have a maximum time difference equal to the delays of the delay lines. In doing so, the gates eliminate the effects of the serration and equalization pulses. A phase comparator compares the times of occurrence of the second and third AND gate signals and introduces to a low pass filter and signals representing the time difference. A voltage controlled oscillator produces a signal having a frequency dependent upon the magnitude of the output voltage from the filter. The frequency of the oscillator signals is passed to a frequency divider. The resultant divider signals are introduced to the first AND gate and the second delay line.

20 Claims, 3 Drawing Sheets

FIG. 5
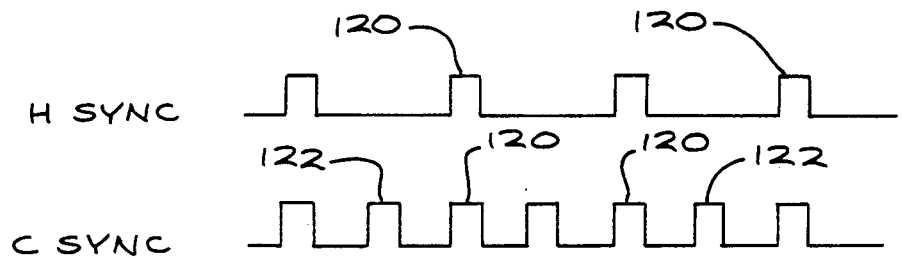
FIG. 6
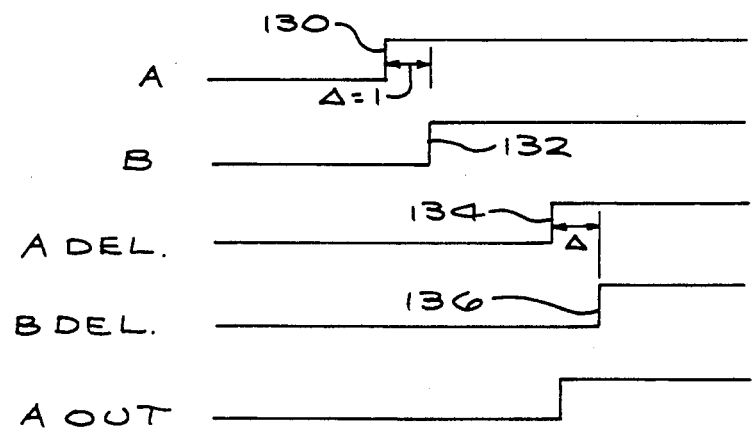
FIG. 7
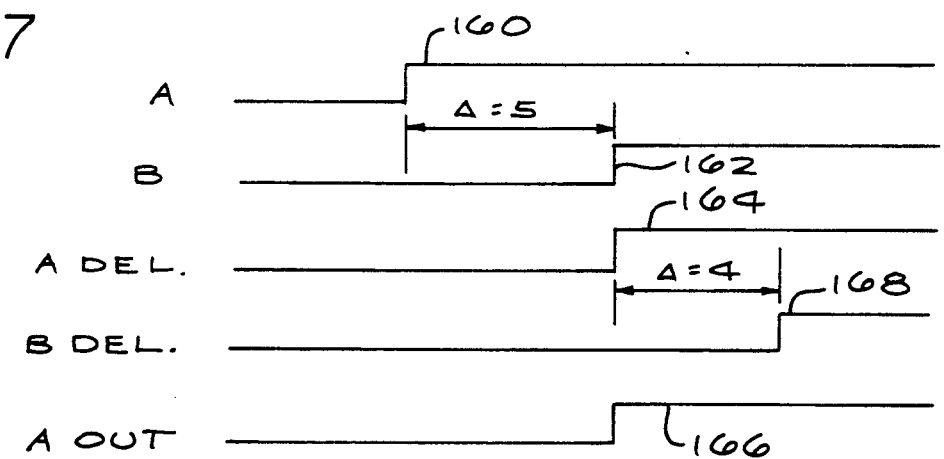
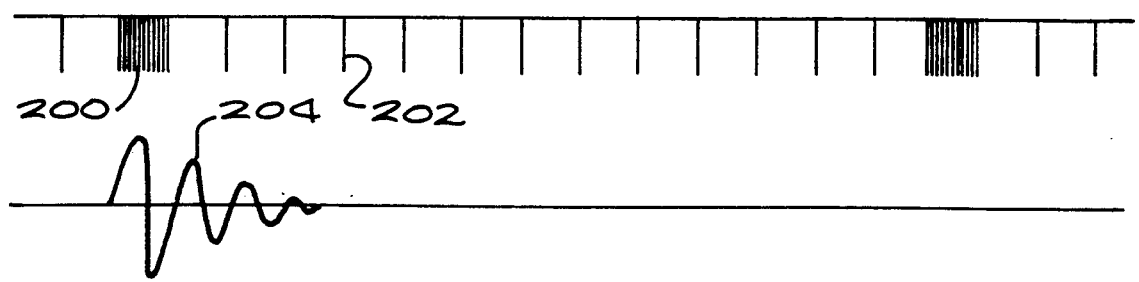
FIG. 8

GENERATION OF HORTIZONTAL SYNC PULSE

This invention relates to a system for generating sync pulses in video signals representing video images. More particularly, the invention relates to a system for eliminating the effects of serration and equalization pulses in generating sync pulses in video signals representing video images.

BACKGROUND OF INVENTION

Video images are generally represented by video signals produced in a raster scan. In such a raster scan, a horizontal sync pulse is produced at the beginning of the video signals representing each horizontal line. A vertical sync pulse is also produced at the end of the video signals representing a complete image. When the vertical sync pulse is produced, there is a relatively long blanking period during which the beam producing the image is returned from the lower right corner of the screen to the upper left corner of the screen so that a new raster scan can be initiated. During this blanking period, serration and equalization pulses are produced periodically to define successive intervals in the vertical blanking period.

One purpose of the sync pulse defining the beginning of each horizontal line is to insure that the beginning of each horizontal line occurs on a regulated basis such that the beginning of the successive horizontal line will define a straight vertical line. This assures that the image will be displayed on the screen without any distortion. To accomplish this, the rate of production of the horizontal sync pulses in the video signal is regulated. However, the serration and equalization pulses interfere with this regulation and adversely affect the time for the production of the sync pulses. This prevents the image displayed on the video screen from being as precise as might otherwise be desired. The problems described in this paragraph have existed for a long period of time without correction in spite of full knowledge in the industry of the existence of this problem over such period of time and consideration over this period of time of how to resolve the problem.

BRIEF DESCRIPTION OF INVENTION

A system constituting one embodiment of this invention eliminates the effects of serration and equalization pulses (periodically generated during the vertical sync interval) in generating output sync pulses to regulate the timing of a video display. The system includes circuitry for stripping and processing the horizontal and vertical sync signals and the serration pulses from the video signals. These pulses are introduced to an input of a first AND gate and through a first delay line to an input of a second AND gate.

Frequency divided oscillator signals are introduced to the first AND gate and to an input of a second AND gate through a second delay line providing a delay equal to that of the first delay line. The output from the first AND gate passes to second inputs of the second and third AND gates. The second and third AND gates produce signals which represent the time difference between the sync pulses and the divider signals and which have a maximum time difference equal to the delays of the delay lines. In doing so, the gates eliminate the effects of the serration and equalization pulses.

A phase comparator compares the times of occurrence of the second and third AND gate output signals and introduces to a low pass filter the signals representing the results of the comparison. A voltage controlled oscillator produces a signal having a frequency dependent upon the magnitude of the voltage from the filter. The oscillator signals are divided by a frequency divider. The resultant signals constitute the divider signals introduced to the first AND gate and to the second AND gate through the first delay line and to the third AND gate through the second delay line.

DESCRIPTION OF DRAWINGS

In the drawings:

FIG. 5 illustrates the generation of the horizontal sync pulses and the vertical sync and serration and equalization pulses in the stages prior to the circuitry shown in FIG. 4 and the generation of only the horizontal sync pulses as a result of the operation of the circuitry shown in FIG. 4;

FIG. 6 schematically shows timing diagrams illustrating the timing relationship of pulses produced at strategic terminals in the circuitry shown in FIG. 4 when the pulses are produced within particular time limits controlled by such circuitry;

FIG. 7 schematically shows timing diagrams illustrating the timing relationship of the pulses produced at such strategic terminals when the pulses are produced outside of such particular time limits;

FIG. 8 shows timing diagrams illustrating how fast the system of this invention responds to correct errors in the timing of the horizontal sync pulses even during a vertical retrace period when serration and equalization pulses are produced.

DETAILED DESCRIPTION OF INVENTION

Figure 1:
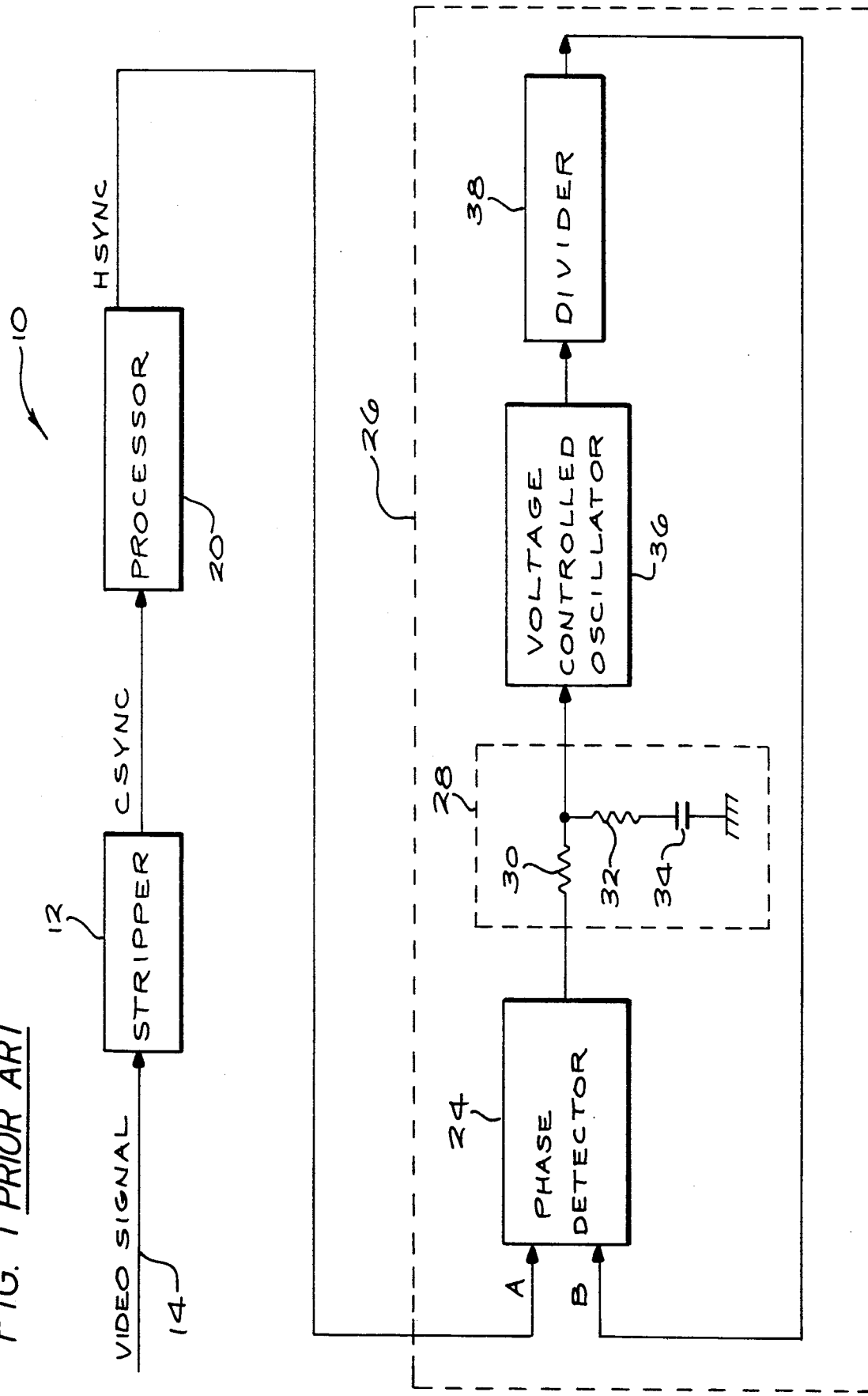
FIG. 1 is a circuit diagram, mostly in block form, of a prior art system for generating sync pulses in a video signal.

A prior art circuit system is shown in FIG. 1 and generally illustrated at 10. The system 10 includes a stripper 12 which receives a video signal on a line 14 and strips the horizontal and vertical sync signals and the serration and equalization pulses from the line. The horizontal pulses are illustrated at 16 in FIG. 3; the vertical sync pulses are illustrated at 17 in FIG. 3; and the serration and equalization pulses are respectfully illustrated at 18 and 19 in FIG. 3. The horizontal sync pulses 16 are produced at the beginning of each horizontal line to provide a timing for the video signals in that line. The vertical sync pulses 17 are produced at the end of the scanning of the bottom horizontal line in a frame and until the beam has been returned to the beginning of the scanning of the top horizontal line. The serration pulses 18 are produced during the vertical sync pulse 17 to provide a timing during the vertical sync pulse. The equalization pulses 19 are produced at the beginning and end of the vertical sync pulse.

The sync pulses from the stripper 12 are introduced to a processor 20 which separates the horizontal and vertical sync pulses and introduces these sync pulses to an input terminal (A) of a phase detector 24 in a phase-locked loop generally indicated at 26 in FIG. 1 and shown in broken lines in that Figure. The phase-locked loop 26 also includes a low pass filter 28 shown within broken lines and schematically illustrated by a resistor 30, a resistor 32 and a capacitor 34 connected in series between the output of the phase detector 24 and a reference potential such as ground. The output voltage on the terminal common to the resistors 30 and 32 is introduced to a voltage controlled oscillator 36. The output from the oscillator 36 in turn passes to a divider 38 which passes its output to another input (B) to the phase detector 24.

Figure 2:
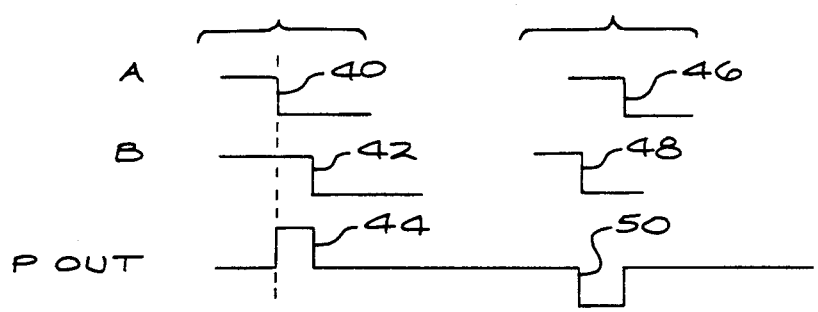
FIG. 2 schematically shows timing diagrams illustrating how the sync pulses are regulated by the system of the prior art for regulating the time of occurrence between successive sync pulses.

The phase detector 24 compares the phases of the sync pulses from the processor 20 and a divided clock signal from the divider 38. These signals are schematically illustrated in FIG. 2. For the case where the negative-going edge of a sync pulse 40 from the processor 20 precedes the negative-going edge of a signal 42 from the divider 38, the phase detector 24 produces a positive signal 44. The positive signal 44 is produced only during the period of time between the negative edge of the pulse 40 and the negative edge of the signal 42. The signal 44 may be considered as a control or resultant signal.

The signal 44 is introduced to the filter 28 which passes only the low frequency components in the signal. These low frequency components cause the frequency of the signals from the oscillator 36 to be increased. The oscillator 36 produces signals at a suitable frequency such as approximately 14.31818 megahertz. The frequency of this signal is divided by a suitable divider such as 910 to produce signals at a suitable frequency such as 15,750 kilohertz corresponding to the frequency of the horizontal sync pulses 16. Since the frequency of the oscillator signals introduced to the phase detector 24 is increased, the phase difference between the sync pulses from the processor 20 and the divider signals 44 is correspondingly reduced.

FIG. 2 also illustrates the case where the negative edge of the sync pulse 46 from the processor 20 follows the negative edge of the signal 48 from the divider 38. Under such circumstances, a voltage pulse 50 having a negative polarity is produced by the phase detector 24. This signal is produced only during the period between the negative edge of the divider signal 48 and the sync pulse 46. This signal is filtered by the filter 28 to produce the low frequency components and these components are introduced to the voltage controlled oscillator 36 to reduce the frequency of the signals from the oscillator. After being divided in frequency by the divider 38, these signals are introduced to the phase detector 24 and the difference in time between the sync pulses from the processor 20 and the frequency-divided signals from the oscillator 36 is narrowed.

In this way, the frequency of the oscillator 36 is regulated to provide the sync pulses at the desired rate for providing a high resolution of the video image on a screen. When the times of occurrence of the negative edges of the pulses from the processor 20 and the frequency-divided signals from the oscillator 36 are the same, no signal is introduced to the oscillator so that the frequency of the signals from the oscillator remains unchanged.

Figure 3:
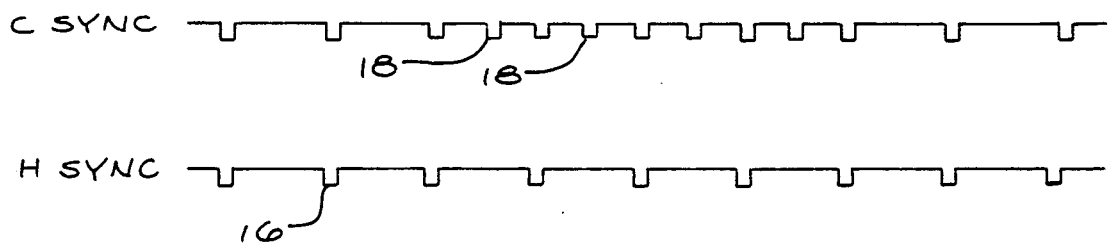
FIG. 3 illustrates how noise signals and serration pulses adversely affect the time between the generation of successive sync pulses by the system of the prior art.

The problem with conventional sync circuits may be readily seen from FIG. 3. During the normal portion where a video signal is being generated at the line 14, the sync stripper 12 receives only the horizontal sync pulses 16 and introduces these pulses to the processor 20. However, during the vertical retrace interval, additional sync pulses pass through the processor 12. These additional pulses are the serration and equalization pulses respectively illustrated schematically at 18 and 19 in FIG. 3. These pulses occur at times when no horizontal sync pulses 16 are being produced.

The pulses 18 cause the phase detector 24 to produce positive pulses which increase the frequency of the oscillator 36. The phase detector 24 outputs a positive level until the next horizontal sync pulse 16 is produced. The net effect of the serration pulses 18 during the vertical retrace period is to increase the frequency of the signals from the oscillator 36 even though no change in frequency is required. The start of the first horizontal sync pulses in the next generation of the video image on the video screen accordingly occurs at an improper time. The equalization pulses 19 produce a similar effect on the timing of the horizontal sync pulses 16.

Figure 4:
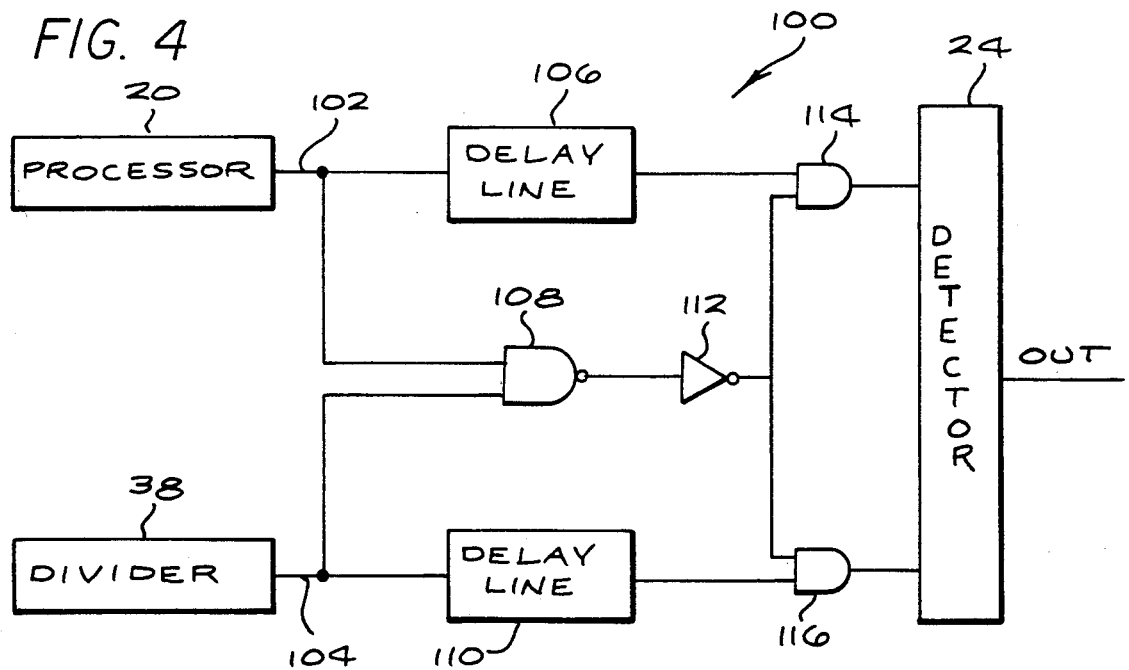
FIG. 4 is a circuit diagram (constituting one embodiment of the invention) in block form for inclusion in the system of FIG. 1 to eliminate the adverse effects of the noise signals and the serration and equalization pulses in generating the successive sync pulses at the proper timing intervals.

FIG. 4 illustrates a circuit generally indicated at 100 and constituting one embodiment of the invention. The circuit 100 includes a line 102 for receiving sync pulses from the processor 20 in FIG. 1 and a line 104 for receiving frequency divided signals from the divider 38 in FIG. 1. The pulses on the line 102 pass to a delay line 106 providing a suitable delay such as approximately four microseconds (4 $\mu$sec.) and to an input terminal of an AND gate 108. The signals on the line 104 pass to a delay line 110 also providing a suitable delay such as approximately four microseconds (4 $\mu$sec.) and to a second input terminal of the AND gate 108.

The output from the AND gate 108 passes to input terminals of AND gates 114 and 116. A second input terminal of the AND gate 114 receives signals from the delay line 106 and a second input terminal of the AND gate 116 receives signals from the delay line 110. The output terminals of the AND gates 114 and 116 are connected to the input terminals of the phase detector 24 also shown in FIG. 1.

FIG. 5 shows horizontal sync pulses 120 in a first row and the horizontal sync pulses and serration and equalization pulses 122 in a second row. The pulses 120 effectively remain after the circuitry shown in FIG. 4 has operated to remove the serration and equalization pulses. The operation of the circuitry shown in FIG. 4 in removing the serration pulses 122 (FIG. 5) is illustrated by the examples shown in FIGS. 6 and 7.

In the example shown in FIG. 6, the sync pulses 130 from the processor 20 precede the divided oscillator signals 132 from the divider 38 by a period of approximately one (1) microsecond (1$\mu$sec). This is indicated in FIG. 6 by $\Delta = 1$. The sync pulses from the processor 20 are indicated at A in FIG. 6 to correspond to the input terminal A to the phase detector 24 in FIG. 1. Similarly, the signals from the divider 38 are indicated at B in FIG. 6 to correspond to the input terminal B to the phase detector 24 in FIG. 1. The delay lines 106 and 110 respectively delay the signals 130 and 132 by four microseconds (4 $\mu$sec.) as indicated respectively at 134 and 136 in FIG. 6. The AND gate 108 in FIG. 4 operates to pass a signal only when both the sync pulses 130 and the divider signals 132 have reached a positive level. Thus, the AND gate 108 operates to produce a signal at the later of the times that a sync pulse 130 has reached a positive level on the line 102 and a divider signal 132 has reached a positive level on the line 104.

The signal produced by the AND gate 108 is introduced to the AND gate 114 as is the signal passing through the delay line 106. The signal passing through the AND gate 114 operates upon the phase detector 24 to obtain an output from the phase detector. This output continues for a maximum period of four microseconds (4 μsec.). Within this period of four microseconds (4 μsec.), the delay line 110 will introduce a signal to the AND gate 116. This signal passes through the AND gate 116 to the phase detector 24 to inactivate the phase detector. The positive signal from the phase detector 24 will have a width just equal to the time difference between the A delayed output 134 and the B delayed output 136. This positive signal causes the frequency of the oscillatory signals from the oscillator 36 to increase, thereby decreasing the period of time between the pulse on the line 102 from the processor 20 and the signal on the line 104 from the divider 38.

FIG. 7 provides an example of the operation of the circuitry of FIG. 4 when the period between the pulse on the line 102 and the divider signal on the line 104 exceeds four microseconds (4 μsec.), the period of the delay provided by each of the delay lines 106 and 110. In the example shown in FIG. 7, the time between the pulse on the line 102 and the signal on the line 104 is assumed to be five microseconds (5 μsec.). This is illustrated by a pulse 160 on the line 102 and a signal 162 on the line 104 and is also indicated by Δ=5 between the rising edges of the pulses 160 and 162 in FIG. 7. This causes the AND gate 108 in FIG. 4 to provide an output five microseconds (5 μsec.) after the signal is provided on the line 102.

The output signal from the AND gate 108 in FIG. 4 passes immediately through the AND gate 114 since the AND gate 14 has been previously prepared for activation by a signal from the delay line 106. The output from the AND gate 114 is illustrated at 164 in FIG. 7. Four microseconds (4 μsec.) after the AND gate 114 starts to pass a signal, the delayed signal on the line 104 passes through the AND gate 116. This is indicated at 168 in FIG. 7. This signal causes the phase detector to be reset. Thus, the phase detector 24 output has a positive level for a period of only four microseconds (4 μsec). even though the period of time between the pulse on the line 102 and the signal on the line 104 exceeds four microseconds (4 μsec.). This is true whenever the signal on one of the lines 102 and 104 precedes the signal on the other line by a time period in excess of four microseconds (4μ). The circuitry shown in FIG. 4 accordingly eliminates any effect of serration pulses 18 or equalization pulses 119 in the operation of the phase detector 24.

FIG. 8 schematically illustrates the period of time in which applicant's system responds to regulate the time between the generation of successive sync pulses. In FIG. 8, vertical retrace pulses are schematically illustrated at 200 and horizontal sync pulses are schematically illustrated at 202. The output signals from the phase detector 24 are schematically illustrated at 204. As will be seen, the regulation in the operation of the phase detector 24 occurs in only a few horizontal lines of the raster scan of a video image.

The system described above has certain important advantages. It regulates the frequency of the signal from the voltage controlled oscillator 36 so that the horizontal sync pulses occur at precisely controlled periods even during the vertical retrace period and the time immediately after the vertical retrace period. The system of this invention accomplishes this by eliminating any effects of serration and equalization pulses on such regulation. The effects of serration and equalization pulses on such regulation are eliminated by producing control signals for regulating the frequency of the signals from the voltage controlled oscillator during the period between the sync pulses from the processor 20 and the signals from the divider 30 when this period is less than a particular value such as approximately four microseconds (4 μsec.). When the period of time between the pulse on the line 102 and the signal from the divider 38 is greater than four microseconds (4 μsec.), the activation of the phase comparator 24 is limited to four microseconds (4 μsec.).

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination,
   first means for providing sync pulses controlling the generation of horizontal and vertical retrace periods in a television image,
   second means for providing comparison signals having a time variable relative to the time of the sync pulses,
   third means for providing a particular delay of the sync pulses and of the comparison signals,
   fourth means responsive to the sync pulses, the comparison signals, the sync pulses with the particular delay and the comparison signals with the particular delay for producing resultant pulses representative, with particular limits dependent upon the particular delay, of the difference in time between the sync pulses and the comparison signals,
   fifth means responsive to the resultant pulses for producing an oscillatory signal having a frequency variable in accordance with the occurrence of the resultant pulses, and
   sixth means for deriving the comparison signals in accordance with the frequency of the oscillatory signal.

2. In a combination as set forth in claim 1 wherein the fourth means produces the resultant pulses after the later to occur of the sync and comparison pulses when the time difference between the sync pulses and the comparison signals is less than, or equal to, the particular delay and the fourth means produces the resultant pulses with a time period corresponding to the particular delay when the time difference between the sync pulses and the comparison signals is greater than the particular delay.

3. In a combination as set forth in claim 1 wherein the fifth means increases the frequency of the oscillatory signal when the sync pulses occur before the comparison signals and the fifth means decreases the frequency of the oscillatory signal when the comparison signals occur before the sync pulses.

4. In a combination as set forth in claim 1 wherein the sync pulses include serration pulses and wherein the fourth means is operative to inhibit any effect of the serration pulses in the production of the resultant pulses.

5. In a combination as set forth in claim 1 wherein the fourth means are operative to inhibit any effect of noise signals in the production of the resultant pulses.

6. In combination,
first means for providing sync pulses including horizontal and vertical sync pulses and serration and equalization pulses,
second means for providing comparison signals,
third means for delaying the sync pulses and the comparison signals by a particular time interval,
fourth means responsive to the sync pulses, the comparison signals, the sync pulses delayed by the particular time interval and the comparison signals delayed by the particular time interval for producing control pulses having a polarity dependent upon the relative times of occurrence of the sync pulses and the comparison signals and having a duration dependent upon the time duration between the sync pulses and the comparison signals and upon the particular time interval,
fifth means responsive to the polarity and duration of the control pulses for producing an oscillatory signal having a frequency variable in accordance with such polarity and duration of the control pulses, and
sixth means responsive to the frequency of the oscillatory signal for providing the comparison signals at times dependent upon the frequency of the oscillatory signal.

7. In a combination as set forth in claim 6 wherein the fourth means include a first delay line for delaying the sync pulses by the particular time interval and a second delay line for delaying the comparison pulses by the particular time interval and further include seventh means responsive to the sync pulses, the comparison signals and the delayed pulses from the first delay line to produce a first output and further include eighth means responsive to the sync pulses, the comparison signals and the delayed signals from the second delay line to produce a second output and wherein the fifth means is responsive to the relative times or occurrence of the outputs of the seventh and eighth means to produce the oscillatory signal having the variable frequency.

8. In a combination as set forth in claim 7 wherein the seventh means are operative only upon the simultaneous occurrence of the sync pulses, the comparison signals and the delayed sync pulses from the first delay line to produce the first output and the light means are operative only upon the simultaneous occurrence of the sync pulses, the comparison signals and the delayed comparison signals from the second delay line to produce the second output.

9. In combination,
means for providing sync pulses from a video signal,
means for providing oscillatory signals having a variable frequency,
means for providing a control signal having a time duration equal to the time between the sync pulses and the oscillatory signals when such time between the sync pulses and the oscillatory signals is less than, or equal to, a particular value and for providing a control signal having a time duration of the particular value when such time between the sync pulses and the oscillatory signals is greater than the particular value, and
means responsive to the control signal for adjusting the frequency of the oscillatory signals in accordance with the time duration of the control signal.

10. In a combination as set forth in claim 9,
the control signal means being operative to provide the control signal with a polarity dependent upon whether the sync pulses occur before or after the oscillatory signals, and
the adjusting means being operative to adjust the frequency of the oscillatory signals upwardly or downwardly in accordance with the polarity of the control signal.

11. In a combination as set forth in claim 10,
means for delaying the sync pulses and the oscillatory signals by a time corresponding to the particular value,
the control signal means including means for providing variable times between the oscillatory signals in accordance with the adjustments in the frequency of the oscillatory signals and including means for providing the control signal with variable characteristics dependent upon the relative times of occurrence of the sync pulses, the oscillatory signals, the sync pulses delayed in time by the particular value and the oscillatory signals delayed in time by the particular value.

12. A combination as set forth in claim 11 wherein the control means include a plurality of logical gates connected in a particular logical relationship.

13. In combination,
means for providing sync pulses from a video signal,
means for providing oscillatory signals having a variable frequency,
means responsive to the sync pulses and the oscillatory signals for producing a control signal having a polarity dependent upon the relative occurrence in time of the sync pulses and the oscillatory signals and having a duration, limited to a particular maximum value, dependent upon the relative times of occurrence of the sync pulses and the oscillatory signals, and
means responsive to the control signal for varying the frequency of the oscillatory signals in accordance with the polarity and duration of the control signal.

14. In a combination as set forth in claim 13,
the control signal means including means for providing a particular delay to the sync pulses and to the oscillatory signals and including means for determining the time relationships between particular pairs of the sync pulses, the oscillatory signals, the sync pulses with the particular delay and the oscillatory signals with the particular delay.

15. In a combination as set forth in claim 13,
the control means including means for providing a particular delay to the sync pulses and the oscillatory signals and including means for limiting the duration of the control signals to a time corresponding to such particular delay.

16. In a combination as set forth in claim 15 wherein the control signal means include a NAND gate and AND gates responsive to the sync pulses, the oscillatory signals, the sync pulses with the particular delay and the oscillatory signals with the particular delay for determining the polarity and duration of the control signals.

17. In combination, means for providing a video signal including horizontal sync pulses and vertical sync pulses and serration and equalization pulses, means for providing an oscillatory signal having a variable frequency, means responsive to the sync pulses and the oscillatory signals for producing, only upon the occurrence of the horizontal sync pulses, control signals, for a duration no greater than a limited period of time, dependent upon the relative times of occurrence of the horizontal sync pulses and the oscillatory signals, and means responsive to the control signals for varying the frequency of the oscillatory signals in accordance with the production of the control signals for the duration no greater than the limited period of time.

18. In a combination as set forth in claim 17, the control signal means including means for determining the polarity of the control signals in accordance with the relative priority of occurrence of the sync pulses and the oscillatory signals and the frequency varying means including means for varying the frequency of the oscillatory signals in accordance with the polarity of the control signals.

19. In a combination as set forth in claims 17 or 18, the control means including means for providing a duration of the control signals in accordance with the time difference between the sync pulses and the oscillatory signals when such time difference is less than, or equal to, the limited period of time and for providing a duration of the control signals for the limited period of time when such time difference is greater than the limited period of time, and the frequency varying means including means for varying the frequency of the oscillatory signals in accordance with the time duration of the control signals.

20. In a combination as set forth in claim 19, the control signal means including means for delaying each of the sync pulses and the oscillatory signals by the limited period of time and including means for combining in a logical network relationship individual pairs of the sync pulses, the oscillatory signals, the sync pulses delayed by the limited period of time and the oscillatory signals delayed by the limited period of time to produce the control signals for the duration no greater than the limited period of time.

* * * * *